United States Patent
Welles, II et al.

(10) Patent No.: US 6,532,495 B1
(45) Date of Patent: Mar. 11, 2003

(54) INTERNET DOWNLOAD ENHANCEMENT SYSTEM

(75) Inventors: Kenneth Brakeley Welles, II, Scotia, NY (US); Aiman Albert Abdel-Malek, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/299,927

(22) Filed: Apr. 27, 1999

(51) Int. Cl.[7] .............................................. G06F 15/16
(52) U.S. Cl. ...................... 709/232; 209/233; 209/234; 209/235; 209/226
(58) Field of Search ................................ 709/232, 249, 709/218, 226, 238, 223, 230, 234, 235, 233; 725/118, 100

(56) References Cited

U.S. PATENT DOCUMENTS

| | | | | |
|---|---|---|---|---|
| 5,181,107 A | * | 1/1993 | Rhoades ..................... | 725/105 |
| 5,635,979 A | * | 6/1997 | Kostreski et al. ........... | 725/132 |
| 5,666,293 A | | 9/1997 | Metz et al. | |
| 5,768,539 A | * | 6/1998 | Metz et al. .................. | 709/249 |
| 5,961,603 A | * | 10/1999 | Kunkel et al. .............. | 709/229 |
| 5,978,855 A | * | 11/1999 | Metz et al. .................. | 709/249 |
| 6,118,472 A | * | 11/2000 | Dureau et al. .............. | 725/109 |

* cited by examiner

*Primary Examiner*—Dung C. Dinh
*Assistant Examiner*—Abdullahi E. Salad
(74) *Attorney, Agent, or Firm*—Jill M. Breedlove; John F. Thompson

(57) ABSTRACT

An Internet download enhancement system for downloading a file comprising an application arranged to initiate a download process and receive a downloaded file over one of a narrow band download path and a broadband broadcast download path, wherein modules in communication with the application are arranged to provide selectable download options among the available download paths. The selectable download options are based at least on an unused bandwidth of one or more of the download paths, thereby enabling the input of a selected download option. The modules are arranged in response to the input to cause a download process to download files over one of the narrow band download path and the broadband broadcast download path and then to output the downloaded file to application.

4 Claims, 5 Drawing Sheets

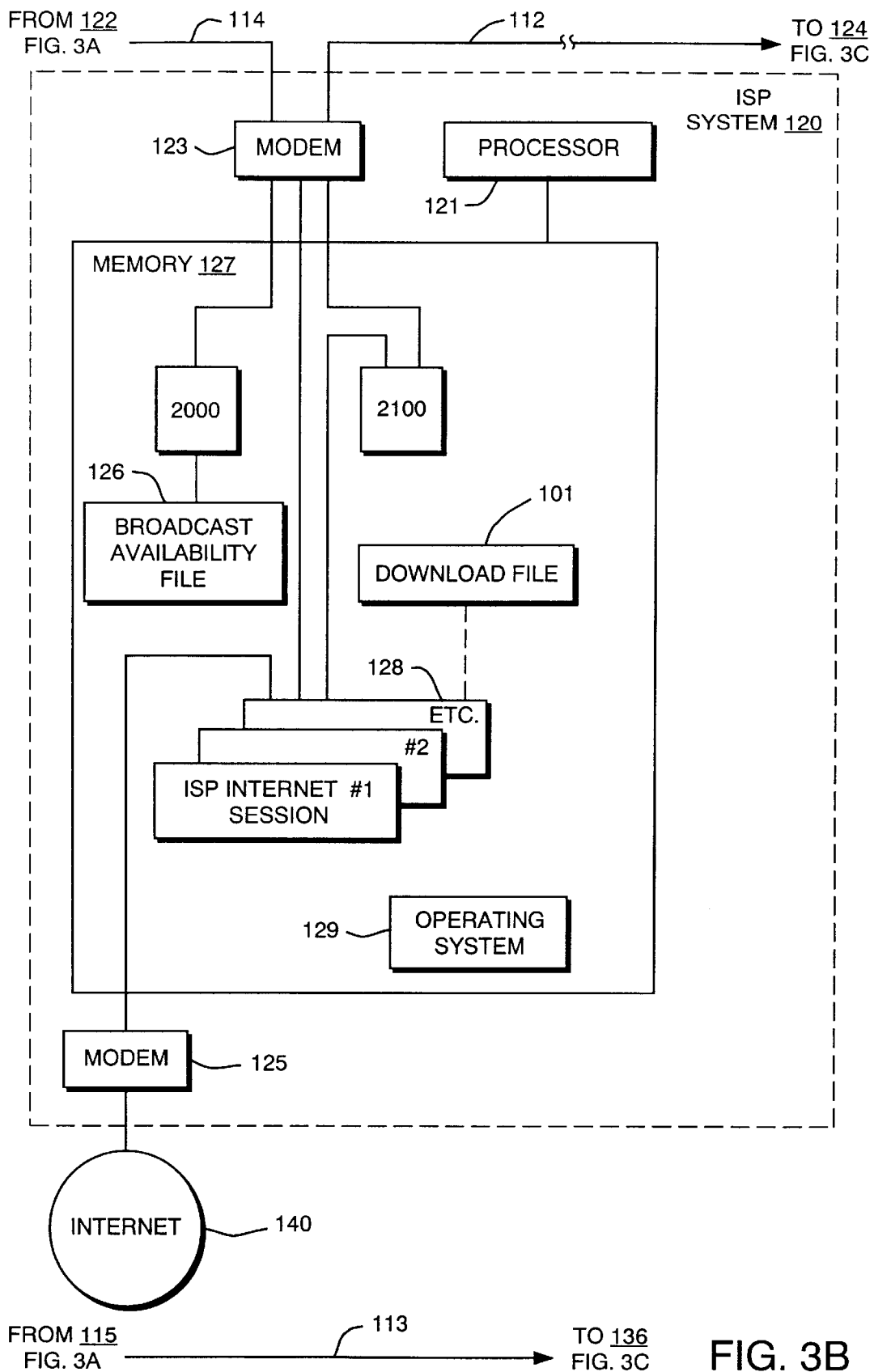

INTERNET DOWNLOAD ENHANCEMENT SYSTEM

BACKGROUND OF THE INVENTION

The invention relates generally to methods of data transfer and specifically to the transfer of data packets over a broadcast radio frequency channel coordinated with a separate point-to-point digital data transfer system, such as a telephone modem-linked Internet access.

The "Internet" (also referred to as the World Wide Web) is a global network of interconnected data links by which various types of data service or functionalities are available to individuals accessing the network via a computer. Both the data service locations and the individuals have unique network addresses on the Internet. Data service or access to the Internet is provided by Internet Service Providers (ISP's) to residential and commercial subscribers. Each subscriber gains access to the Internet in the form of a separate operative session. Such sessions operate simultaneously and independently of each other. Each subscriber at a respective address can initiate a session through the use of a computer connected to an ISP at its respective address on the Internet. The ISP provides a competitively priced package of functionalities tailored to one or more types of subscribers, including at least basic access to the Internet. Additional services that are frequently made available include electronic mail, access to one or more Internet search engines, known as browsers, chat rooms, news features, weather information, and advertising space. Such functional features appear on the subscriber's computer screen as choices and, when selected, connect to the source providing that feature, so that the selected functional feature appears on the subscriber's screen. Because there is a basic access to all Internet addresses, the subscriber can contact and interact with any Internet address to obtain information or a file from that address, more commonly known as "downloading the file" from that address. A typical subscriber session is an electronic communication with the ISP requesting a selected functionality, and also through the ISP to various other network locations on the Internet which provide selected additional functionalities or files which can be downloaded to the subscriber's computer.

Typically, most electronic data traffic in a given subscriber session consists of a dialog of inquiries and responses paced at the timing of human discourse. While graphics data accompanies much of this traffic, the relative size of each portion of the dialog compared to the movement of substantially large files of data is small. On occasion, the subscriber may request receipt of a large file containing any of numerous data-types, e.g., it can have a particular digital format and a narrowly tailored application. A large file can be an exceptionally large text file, or it can be a file representing a scanned photograph, a video recording in the form of a sequence of video frames, or a file containing computer-executable code such as a software application, computer game, or operating system component. Thus, it can be appreciated that data transfers requested by typical subscribers on the Internet are bursty, i.e., small or large amounts of data are requested, followed by little or no data requests for periods of time.

One major problem with downloading large files from the Internet is the capacity of the network to convey large files at speeds acceptable to the Internet subscriber. Capacity is defined by the available bandwidth of the particular network route over which the files are transmitted, and low available bandwidth results in longer download times. An additional consideration is the manner in which both the subscriber's computer and the source of the transmitted file are connected to the Internet. While each network link comprising the particular route the file travels between source and subscriber destination has an associated bandwidth, both the initial and the final link between the ISP and the subscriber can be the most troublesome. When a modem connection to a public-switched telephone line is employed, communication though the data network is constrained to data rates in the tens of kilobits per second (e.g., 11, 16 or 56 kbits per second) or low hundreds of kilobits per second in the case of a hard-wire equivalent integrated services digital network (ISDN) line. As an alternative, cable television providers offer a high speed connection service through a cable modem. However, use of a cable modem is expensive because the cable connection is priced at premium levels. A cable modem connection is a full-time connection, not an on-demand connection, as opposed to a modem connected to a telephone line.

Various methods have been proposed to shorten the time required to download large data files by utilizing more than one data path. For example, U.S. Pat. No. 5,181,107 to Rhodes, discloses an information service distribution system wherein a terminal device connected to a television network and to a point-to-point, public-switched telephone line. A subscriber requests a menu of information services (or already has a menu from a previous request) over the telephone line. After appropriate identification has been made for billing purposes, the subscriber can request a selection from the menu (or pay for additional use of a previous selection), such as a video game, dating services, shopping selection, etc., stored in a remotely located information services storage center. In response to the request conveyed over the telephone link, the center transmits files encoded as digital bit streams over a television broadcast channel. While menus are received and decoded by all subscribers, only the requested file is decoded at the requesting subscriber location. There are several drawbacks to this system. For example, the system is restricted to selections from a fixed menu; selected information service is displayed/interacted with only on the subscriber's television set; there is no access to all downloadable files available on the Internet; and there is no choice between point-to-point and broadcast downloading paths.

U.S. Pat. No. 5,768,539 to Metz et al., discloses a downloading generating system that utilizes a broadband digital broadcast channel and a separate narrow band two-way data communications channel. The digital broadcast network includes provision for downloading executable applications software over one broadcast channel and video programming over a second broadcast channel. The two channels can be multiplexed on a single transport stream. The narrow band two-way data communications capability is for signaling interactive text services such as video file requests. The system includes a set-top device at the subscriber location which, when instructed by the subscriber, transmits data request signals over a narrow band two-way data channel provided by a public switched telephone network or alternatively, by a coaxial cable, e.g., a cable television network cable. The data requests are relatively short messaging-type communications which can be accommodated on the available narrow band two-way data channel. The data provider, which can be an ISP, responds by downloading both packets of executable code and the requested video data file in the form of compressed data for a plurality of video frames to the subscriber over the digital broadband channels. The downloaded executable code, along with a resident software application, are stored and executed in a protected memory device that includes an operating system in the subscriber's set-top terminal. The set-top terminal can emulate a CATV tuner/decoder for channel selections. Execution of the downloaded code received over the first broadcast channel in turn controls selective capture and presentation of audio and video segments received over the second digital broadcast channel. The billing and other administrative data is communicated to the subscriber over the narrow band two-way data channel.

The Metz et al. system is principally directed toward video-on-demand wherein a known library of video programming is maintained for on-demand download requests by subscribers. While this arrangement enables the transport of digital program information over a relatively fast digital broadcast channel, it is limited to first downloading executable control code into the memory of a subscriber's set-top terminal, and then utilizing that executable control code to control the operation of the set-top terminal to identify and receive a specific data-type, i.e., the audio and video segments of the program information, as distinguished form any executable computer control code. A disadvantage of the system disclosed in the Metz et al. Patent is that it does not offer the capability of downloading generally any file obtainable from any source on the Internet to a specified subscriber on a demand basis. In addition, executable code must be downloaded over the broadband network to the subscriber to enable the subscribers computer to identify and download the accompanying digital program information.

Internet subscribers generally require, on an on-demand basis, the download of one or more large data files of a wide variety of data-types, where the data file could be obtained from any source connected to the Internet. A common complaint by Internet subscribers is that the data transfer rate over telephone lines, a procedure now commonly in use, is slow. Further, complicating the picture, as computers make increasing use of graphics and audio/video segments, the size of downloaded data files will continue to grow. However, the faster ISDN lines needed to handle large files are expensive to install and maintain.

Downloading operating systems such as the above-described system of Metz et al., do not provide general access to available files on the Internet in combination with a choice of download resources, i.e., over slower (and cheaper) telephone lines, or over faster (and more expensive) broadcast channels. A low cost system is needed that significantly reduces download response time Internet subscribers while enabling such users to use the narrow band communications resources provided by a public-switched, point-to-point telephone lines for communicating request-response type Internet communications between the subscriber and the subscriber's ISP. A further need is for such a low cost system that provides an option of sharing the use of a high data rate broadcast data channel for downloading substantially large amount of data, regardless of its data-type and source on the lnternet.

BRIEF SUMMARY OF THE INVENTION

In accordance with this invention, a system for enhancing the process of downloading files from the Internet, includes a low cost data receiver for receiving radio frequency signals, a digital data demodulator and software components located both at an ISP and at the subscriber's location, that together enable an Internet subscriber to select and communicate a choice of available high speed and low speed download paths for downloading a data file from a downloading source to the subscribers computer. The high speed download path option may comprise one or more broadcast data channels, such as, or example, a digital television broadband broadcast channel. The relatively slower low speed download path option may comprise a narrow band, two-way, point-to-point data channel, such as, for example, a public-switched telephone line.

The broadcast data channel transmits alternatively any one or more types of a stream of digital data packets forming part of a broadcast signal. The point-to-point data transfer channel may be a telephone modem link, such as a public-switched telephone modem link, connected between a subscriber-located computer and an ISP. The data receiver is any data receiving means, e.g., a radio frequency receiving means such as a high definition digital television (HDTV) tuner, analog television tuner, radio tuner or satellite receiver. The demodulator is a system for demodulating digital data from the data receiver and transferring the demodulated data to software residing in the subscriber-located computer.

To accomplish this arrangement, a high speed link is provided between an Internet service provider (ISP) and one or more broadcast data channel providers, and a separate well known lower speed link is provided between the ISP and the subscriber. A third link receivable by all subscribers (and non-subscribers who lack the appropriate data receiver and therefore cannot detect the presence of the downloaded file contained within the broadcast signal), is a broadcast channel originating from the broadcast channel provider.

The option of sharing the use of a high data rate broadcast data channel provided by a broadcast channel provider, for downloading substantially large amounts of data, regardless of its data-type and source on the Internet, depends in part on the availability of the unused portion of the broadcast data channel, i.e., the unused bandwidth. Content providers, such as the NATIONAL BROADCAST CORPORATION™, Inc., which own and operate numerous television broadcast stations in major metropolitan areas, are implementing a capability for broadcasting digital television signals over a television channel allocated to them by the Federal Communications Commission (FCC). The television channels are connected to the television subscriber by numerous well known methods, for example by television transmission or by cable television network providers. The FCC permits the use of the 19.3 Mbit/second data rate digital signal to include both audio and video information with unused bandwidth to be made available for other purposes. According to the present invention, one such purpose is to provide the extra data bandwidth to the ISP, thereby providing an additional revenue stream to the broadcaster from the otherwise unused portion of the data bandwidth. The above-described large data files downloaded from an ISP to one of many Internet subscribers, who receive Internet connectivity services from that ISP, advantageously can be communicated over the bandwidth available on the digital broadcast channel.

When a subscriber in networked communication with an ISP that provides Internet connection service to the subscriber over a narrow band two-way data channel transmits a request to download a large data file (which may originate from any addressable location on the Internet), software located at the ISP queries an updated broadcast channel availability status file to determine unused bandwidth availability for one or more broadcast channels. The ISP-located software communicates this availability over the narrow band two-way telephone channel to software resident in the subscriber's computer, which displays information including the size of the desired file to be downloaded, the computed download time and associated cost for the broadband digital broadcast download path option. The software resident in the subscriber's computer also displays similar narrow band download information, along with options for the subscriber to select the desired download method. If the slower, narrow band, two-way, point-to-point data channel is selected, a software module located at the ISP detects this selection and directs other software located at the ISP to encode and then download the desired data file over the narrow band route, which connects to Internet application software residing in the subscriber's computer. If the faster broadcast channel option is selected, a software module located at the ISP encodes the file with a subscriber-specific identification and then (after obtaining the file from its Internet address source) directs the desired data file to be transmitted over a high speed network link between the ISP and the broadcast channel provider, where a separate software module introduces the desired data file into the television broadcast data channel to be transmitted as part of the broadcast signal. The subscriber is billed for use of the broadcast channel. While the desired data file can be received by all broadcast channel receivers, only those with data receivers of the present invention can detect the desired data file, and only the requesting subscriber's data receiver will identify and store the subscriber-specific encoded file. The file can be encrypted prior to transmission and decrypted upon receipt, thereby preserving privacy. The digital data demodulator of the present invention, also located at the subscribers location, demodulates the received and identified digital data, and transfers it to the subscribers computer for storage and access by the Internet application and other applications, as necessary, thus completing the download process of the Internet download enhancement system.

DETAILED DESCRIPTION OF THE INVENTION

Figure 1:
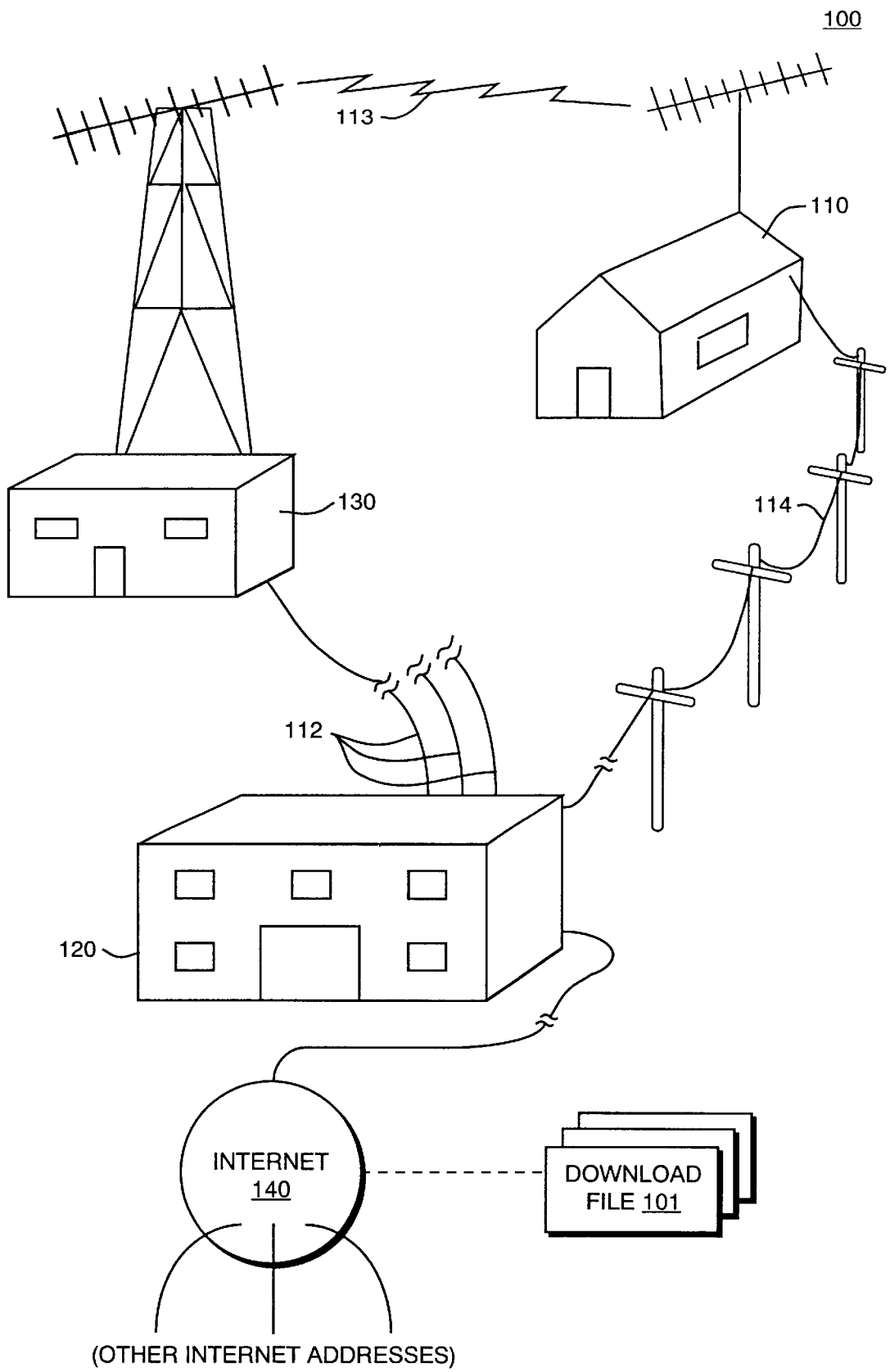
FIG. 1 is an illustration of an exemplary embodiment of a download data communications system according to the present invention.

The present invention embodied in the Internet download enhancement system 100 shown in the block diagram of FIG. 1, comprises an ISP subscriber system 110, an ISP system 120, a broadcast channel provider system 130, inter-connecting network links 112, 113, 114, and software modules located in computers at systems 110, 120, and 130 that enable a selected data pathway, according to a selection expressed by a subscriber (not shown) at subscriber system 110, for the download of a download file 101. System 100 can employ any radio broadcast system, including any frequency allowable by the Federal Communications Commission, for example, AM, FM, short-wave and analog and digital television frequencies, along with a receiving means such as a HDTV tuner, analog television tuner, radio tuner or satellite receiver. Preferably, system 100 includes an HDTV broadcast signal and accompanying receiver and includes encryption of the download file 101 prior to transmission and decryption upon receipt at a subscriber system 110. In FIG. 1, a computer located at ISP system 120 is connected to a computer located at broadcast channel provider system 130 by a high-speed data link 112. Data link 112 can be any suitable high-speed data link, for example, copper, coaxial cable, fiber optic, microwave, in combination with a supported high-speed communications protocol. The computer at broadcast channel provider system 130 is connected to a computer at subscriber system 110 by a data link 113 that carries a broadband broadcast data signal. The broadcast data signal can be any one or more of a stream of digital data packets forming part of a standard ATSC/HDTV broadcast, for example a 19.3 Mega-bit per second signal modulated on 6 MHz TV channels with 8VSB excitation, digital data modulated onto the vertical blanking interval (VBI) of an analog television signal, digital data modulated invisibly onto the video portion of an analog television signal, digital data on a radio sub-carrier, or satellite data such as received by subscriber-located commercial satellite television receivers. ISP system 120 is also connected to subscriber system 110 by a point-to-point data transfer channel 114, such as a public-switched telephone modem link, an ISDN line, or the equivalent. ISP system 120 can be connected to a plurality of broadcast channel provider systems 130, and to a plurality of subscriber systems 110. ISP system 120 is further interconnected to other sources of data files on the Internet 140 by well known Internet connection means.

Figure 2:
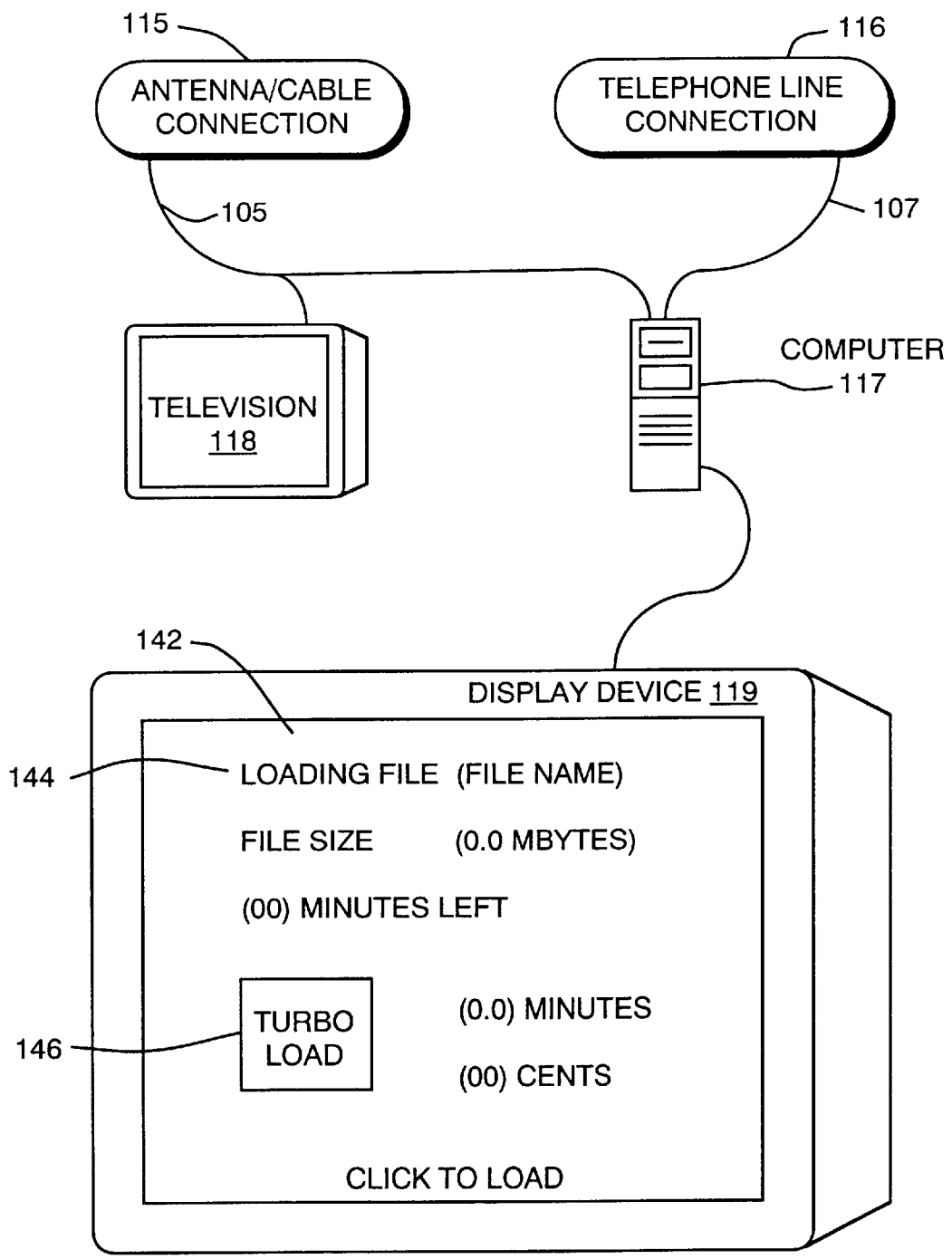
FIG. 2 is a more detailed illustration of the Internet subscriber location of FIG. 1.

Referring now to FIG. 2, the subscriber system 110 includes an antenna/cable input 115 and a telephone line input 116, both connected respectively in a well known manner via lines 105 and 107, to a computer 117, for example, a personal computer having an internal cable modem and telephone modem, respectively. Antenna/cable input 115 optionally may also advantageously be connected to a signal receiver 118 appropriately compatible for the type of signal transmitted over link 113. For example, receiver 118 can be a television set adapted to receive a television signal via input 115. The receiver 118 can be arranged to operate independently of, and in parallel with, the system 100 of the present invention.

Computer 117 is arranged to present on a display device 119 an option selection menu 142 suitable for subscriber input. The exemplary menu shown by way of illustration, and not limitation, includes information 144 about a file to be downloaded from the Internet 140 to the subscriber's computer, for example, file name, file size and current download time utilizing the default slower narrow band download option and as many high-speed options as available. One or more option icons 146, preferably in the form of buttons or screen icons, can be activated by a computer keystroke or mouse click for user selection of a particular higher speed broadcast link 113 alternative to the default slower speed, narrow band, two-way, point-to-point telephone line connection 114. Any selection means, such as a switch, mouse, touch pad, or a computer keystroke is contemplated as being equivalent in function to icon 146.

In any typical downloading procedure common in the art, a download process typically involves an Internet user who is using a particular software application connected to the Internet, such as an ISP application providing Internet access. Using such an application, the user enters a download request command, which includes identification of the download file and the source address (also known as "path") of the download file, followed by the user entering a download initiation command that causes the file to be downloaded to the user's computer.

The download process of system 100, according to the present invention, proceeds in the same way. However, system 100 includes detection of the first download command, i.e., the download request command input by the user, which causes an information control module 1000 (shown in FIG. 3) of system 100 to present a selection menu 142. The selection menu 142 displays one or more high speed options, and a slower, narrow band download path option, preferably the default selection. Alternatively, the download process of system 100 includes detection of the second download command, the download initiation command, which causes control module 1000 to present selection menu 142. At any point, the subscriber has the option of selecting a high speed option 146, preferably called "Turbo Load", which would interrupt the download process and shift the routing from the slower narrow band download path to the selected high speed download path option. Other variations of this download process are possible, all of which provide subscriber selection of download paths. Selection menu 142 can show comparison costs and timing for any number of available communication links 113 and 114. As will be described below, the options and information displayed on menu 142 are periodically updated to reflect current availability of download resource options.

Figure 3A:
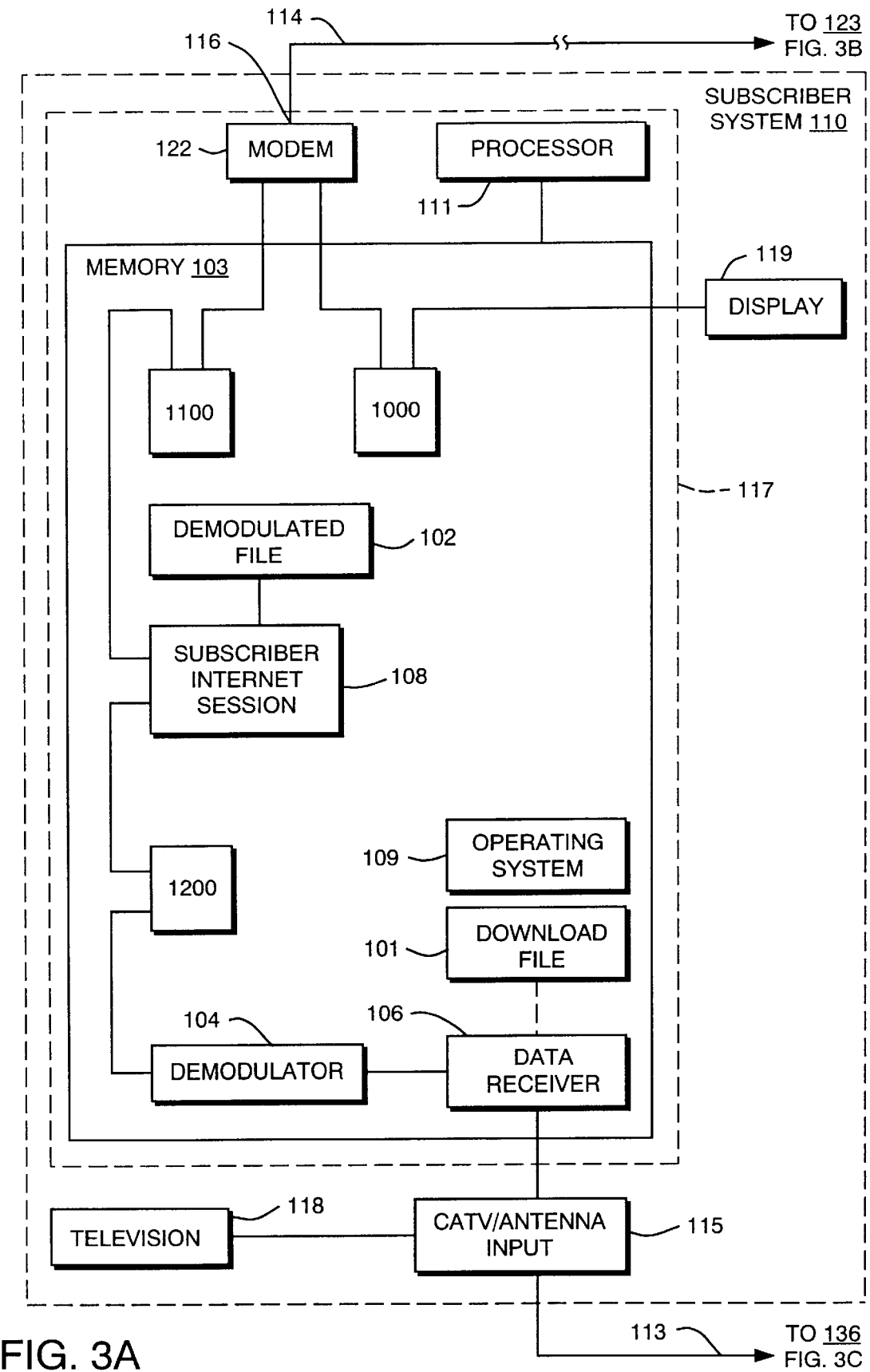
FIG. 3 is a block diagram showing the inter-relationship of system components according to the present invention.
Figure 3C:
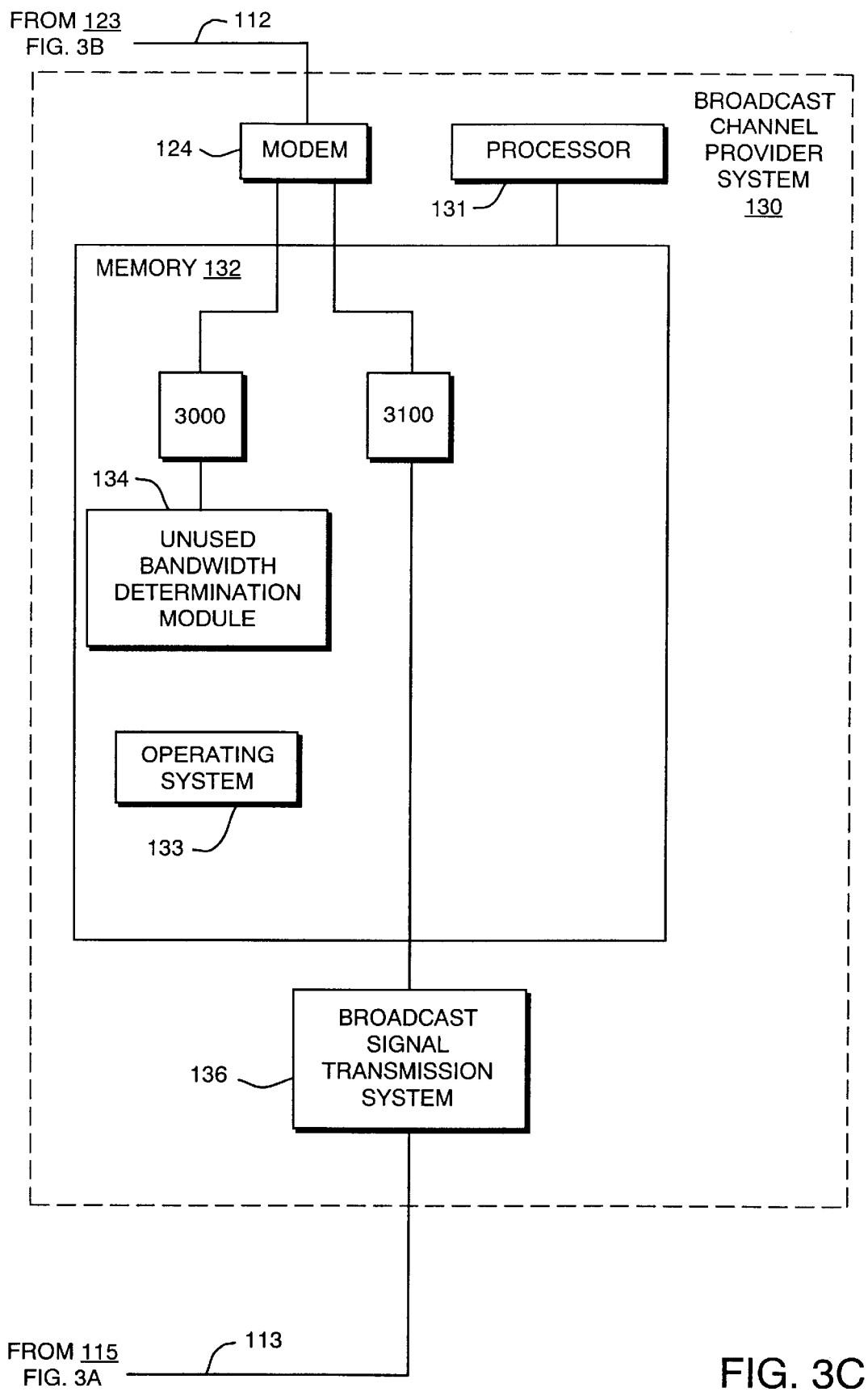

FIG. 3 is a block diagram of the Internet download enhancement system 100 according to the present invention, showing the connections between systems 110, 120 and 130. Subscriber system 110 includes a computer 117, a display device 119, a CATV/antenna input 115 and an optional television set 118. Computer 117 includes a subscriber processor 111 including subscriber memory 103, which includes a local subscriber operating system 109, software modules 1000, 1100, 1200, all interconnected via modem 122 and data link 114 to ISP system 120, and a demodulator 104 connected to a data receiver 106. Alternatively, both demodulator 104 and data receiver 106 can be hardware devices connected to processor 111.

Data receiver 106 is connected to the cable television/antenna (CATV/antenna) input connection 115 and also to an optional television set 118, so that a data stream input to connection 115 is conducted to both the television set 118 and to the data receiver 106. The data receiver 106 detects digital data packets among the data stream as potential data packets to be demodulated, and if the identity of the data packets is verified as belonging to a download file 101 to be downloaded to the specific subscriber system 110 requesting the download, the data receiver 106 receives the data packets corresponding to the downloaded download file 101. Data receiver 106 identifies the data packets by comparing one or more data packet identifiers with a stored identifier (not shown) that is unique to the subscriber system 110. The stored identifier can be stored on a disk storage device (not shown) or other suitable storage means and the identifier includes one or more identifying characters particular to a specific subscriber system 110. Alternatively, the identifier may represent one of several subscribers at a given system 110. Alternatively, the identifier may be mobile, i.e., it may be entered by a subscriber at any specified group of systems 110. Alternatively, the identifier may be communicated to processor 111 by ISP 120 then the phone line 114 immediately before the download occurs.

Data packets received and identified to be downloaded by data receiver 106 are demodulated by demodulator 104 and stored in memory 103 as a demodulated file 102 for subsequent access by any stored application capable of interpreting the file, for example, a resident application including a subscriber Internet session 108, a word processor, or a graphics interpreter. Subscriber memory 103 includes a subscriber operating system 109 of known design, which, in conjunction with operator input through an input device (not shown), such as a keyboard or mouse, enables the functionality described herein.

FIG. 3 also illustrates system 100 in terms of various software modules associated with systems 110, 120, and 130. These modules can be physically and logically configured in a variety of ways to achieve the functionality described herein, and the arrangement provided herein is shown by way of illustration, and not limitation. In the exemplary arrangement of FIG. 3, the software modules located at the subscriber system 110 are identified as 1000, 1100, 1200, modules located at the ISP system 120 are identified as 2000–2100, and modules located at the broadcast channel provider system 130 are identified as 3000–3100.

Subscriber system memory 103 is arranged to include (during use by a subscriber) a subscriber Internet session 108, which comprises a resident application including an interactive session between the Internet session software 108 located at the subscriber system 110, which responds to subscriber input, and a corresponding resident application arranged to include an ISP Internet session 128 residing in ISP system memory 127, located in ISP system 120. ISP Internet session 128 typically is one of a plurality of ISP Internet sessions 128 numbering 1, 2, etc., each corresponding to, and in modem-communication with, other subscribers, all of which are simultaneously and independently active in a manner well known in the art.

Subscriber system memory 103 includes software modules 1000, 1100, 1200, along with a subscriber Internet session 108 and operating system 109, all retrieved from a fixed storage (not shown), as appropriate. When a subscriber inputs commands to download a download file 101 during a subscriber Internet session 108, typically at least two commands are involved, as discussed above, i.e., a download command, which results in a download screen containing a means of entering (or selecting) a specific download file 101, followed by a commence-download command, for executing the downloading process.

In a first embodiment, an information control module, shown as 1000, detects the second commence-download command and interrupts the subsequent execution of that command and in any sequence, initiates through modem 122 and data line 114 a data retrieval communication with module 2000 (to be described) included as part of the ISP system 120. The 1000 module receives the requested data, forms information 144 (FIG. 2) and populates a selection menu 142 with information 144, and displays selection menu 142. The data retrieval communication is a query of high speed data channel availability information. Module 1000 receives data from module 2000 via modem 122 and data line 114 relating to real-time, or near-real time high speed download channel availability from module 2000 and then populates menu 142 with information 144 based on data received from module 2000. Software module 1000 calculates download times based on the received data, and arranges information 144 to include the calculated download time and an associated selection icon 146. Any arrangement of selection icons enabling the selection of the default, slower speed option or any of the higher speed options is contemplated. Alternatively, the download time for high speed download options can be calculated at module 2000 and communicated to module 1000, in which case module 1000 communicates the size of download file 101 to module 2000. Alternatively, module 1000 can poll module 2000 for high speed download option availability at specified time intervals independent of a subscriber-initiated download request.

In a second embodiment, module 1000 detects, but does not interrupt the execution of the subscriber initiated commence-download command, and causes the updated selection menu 142 to be displayed while the default narrow band download process is running. The subscriber has the option of selecting a high speed download option icon 146 included in selection menu 142, and selection of icon 146 is detectable by module 1100, to be described next.

Subscriber system memory 103 also includes a download path selection detection module, shown as 1100, which detects the subscriber-selection of a selection icon 148 and communicates that selection to one of the subscriber Internet sessions 108 and a software module 2100 (to be described) located at the ISP. In the case of the selection of the narrow band data channel, a communication is made internal to subscriber system 110 with the subscriber Internet session 108 that causes the subscriber Internet session 108 to commence the file download over the narrow band data channel by way of modem 122 and telephone line input connection 116. This is accomplished by any method known in the art, for example, by changing a pointer or index in the subscriber Internet session 108. In the case of the selection of a high speed data channel, module 1100 communicates via modem 122 and data line 114 with module 2100, located at ISP system 120, which results in the initiation of the download (to be described) of file 101 over a specified broadcast data channel.

In one exemplary embodiment, the download of a file may be, for example, a file for storage in subscriber system 110 (FIG. 3), and alternatively, a file which is used for immediate display on display device 119, such as a web page or image. A user may request any data transfer by clicking on a link which will initiate the default data transfer (file download) via inter-connecting network link 114. When module 2000 in computer system 120 detects that the transfer time will be long on network 114, for example greater than five seconds, but short on network 113, for example less than one second, then module 2000 presents the subscriber with option 142 for high speed download. If the user takes no action, the file will continue to transfer over network 114.

Subscriber system memory 103 further includes a downloaded file detection module, shown as 1200, connected to demodulator 104, which in turn, demodulates downloaded file 101, thereby creating demodulated file 102. Module 1200 detects the presence of demodulated file 102 and provides file 102 to the subscriber Internet session 108. Module 1200 detects the presence of file 102 by polling demodulator 104 or alternatively, demodulator 104 informs module 1200 of receipt of a demodulated file 102 by any generally known means, for example, by changing the value of a pointer or an index.

ISP system 120 includes an ISP processor 121 including ISP memory 127, which includes a local ISP operating system 129, broadcast channel availability file 126, and software modules 2000–2100, both connected via modem 123 and data link 114 to modem 122 at subscriber system 110, and via modem 123 and data link 112 to modem 124 at broadcast channel provider system 130. The broadcast channel availability file 126 is connected to module 2000 and unused bandwidth information stored in file 126 is updated on a periodic basis, or alternatively, when queried by a communication from software module 1000 located at the subscriber system 110. Update of file 126 is accomplished by module 2000 initiating on a periodic basis a request over data link 112 to module 3000 (to be described) located at broadcast channel provider system 130, or alternatively, module 3000 initiates an update of file 126 over data link 112. Module 2000 communicates information based on the broadcast channel availability file 126 to module 1000, so that module 1000 can populate menu 142 with information 144 based on the information communicated from module 2000.

The Internet file download enhancement system 100 inherently is able to download a file from any point on the Internet 140 capable of supplying a downloadable file, because the subscriber Internet session 108 can request any such file while operating in conjunction with ISP Internet session 128. This is possible because the subscriber Internet session 108 communicates via modem 122, data link 114, and modem 123 with the ISP Internet session 128, which is also connected via modem 125 to the Internet 140.

A download path detecting and file transmitting module, shown as 2100, reads the file name and path of the download file 101 from the ISP Internet session 128 (FIG. 2) at a specified point in time, for example, whenever the subscriber indicates selection of a high speed download path for the downloading of download file 101. Module 1100 detects the subscriber's selection of option icon 146 on selection menu 142 and communicates via modem 122, data link 114, and modem 123 with module 2100. In response, module 2100 transmits the download file 101 via modem 123 and link 112 to modem 124 located at broadcast channel provider system 130, and thence to module 3100 (to be described) for insertion into a broadcast signal stream.

It is contemplated that modems 123, 124, 125 and link 112 preferably are high speed devices well known in the art and represent all types of high speed network communications devices, including for example, a cable modem, a satellite based T1 line, a microwave line, or the like.

Broadcast channel provider system 130 includes a broadcast processor 131 including memory 132, which includes operating system 133, an unused bandwidth determination module 134, and software modules 3000 and 3100, both connected to modem 124. A bandwidth reading module, shown as 3000, reads the unused bandwidth of a current outgoing broadcast signal 113 from an unused bandwidth determination module 134 commonly known in the broadcast transmission art. Module 3000 makes the current unused bandwidth value available via modem 124, data link 112, and modem 123 to module 2000.

A download file insertion module, shown as 3100 receives the download file 101 via modem 124, data link 112, and modem 123 from module 2100. Module 3100 is connected to broadcast signal transmission system 136 and inserts the download file 101 into the broadcast signal stream generated by transmission system 136. File insertion can be accomplished by any generally known means, for example, by packetizing the broadband program signal and the data file 101 in digital packets conforming to the ATSC standard for digital television broadcast digital data stream. The download file 101 can be configured for broadcast transmission and tagged with an identifier corresponding to the requesting subscriber at any appropriate point, for example, at module 2100 or module 3100. Optionally, file 101 can be encrypted for security at any point prior to transmission over the network, for example, an encryption algorithm can be part of module 3100 or part of a separate module. Decryption of file 101 can take place any convenient point after reception by the data receiver 106, for example, the decryption algorithm can be part of either the data receiver 106 or the demodulator 104. The transmission signal 113 is broadcast for reception by any receiver, but is decodable by a specific data receiver 106, which is arranged to recognize the signal in general and identify the identifier tag portion of the transmitted signal 113, thereby completing the download process of the Internet download enhancement system.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An Internet download enhancement system for downloading a file comprising:
   (a) a subscriber system comprising:
       a data receiver;
       a demodulator, said demodulator arranged to receive said file from said data receiver and output a demodulated file;
       a processor including a memory, an operating system residing in said memory for controlling operations of the subscriber system, and modules residing in said memory, said modules comprising:
           a subscriber resident application including at least one subscriber Internet session arranged to receive one of said downloaded file and said demodulated file and connected to said demodulator, said subscriber Internet session being responsive to subscriber input and arranged to identify said file based on said input, wherein said file is received by a first download path and said demodulated file is received by a second download path;
           an information control module for detecting a download request input to the application by a subscriber, obtaining broadcast channel availability information and displaying said information;
           a download path selection module for detecting a selection of a download path selected by said subscriber and outputting data to one of said subscriber Internet session and a download path detecting and file transmitting module; and
           a downloaded file detection module for detecting presence of a downloaded file and providing the file to the subscriber Internet session;
   (b) an Internet services provider (ISP) system comprising:
       a processor including a memory, an operating system residing in said memory for controlling operations of the ISP system, and modules residing in said memory, said modules comprising:
           an ISP resident application including at least one ISP Internet session connected to an Internet for receiving a file, said ISP Internet session being responsive to said subscriber session;
           a broadcast availability file that stores updated unused
       a processor including a memory, an operating system residing in said memory for controlling operations of the ISP system, and modules residing in said memory, said modules comprising:
           an ISP resident application including at least one ISP Internet session connected to an Internet for receiving a file, said ISP Internet session being responsive to said subscriber session;
           a broadcast availability file that stores updated unused bandwidth availability information relating to one or more broadcast channels;
           an update module for updating said broadcast availability file, said update module being connected to an unused bandwidth reading module for reading said availability information and to said information control module for output of said information; and
           said download path detecting and file transmitting module for receiving input and transmsmitting said file to a download file insertion module for insertion of the file into a broadcast signal stream generated by a broadcast signal transmission system;
   (c) a broadcast channel provider system comprising;
       a processor including a memory, an operating system residing in said memory for controlling operations of the broadcast channel provider system, and modules residing in said memory, said modules comprising:
           said unused bandwidth reading module for reading data from an unused bandwidth determination module;
           a broadcast signal transmission system; and
           said download file insertion module for receiving said file and outputting said file to said broadcast signal transmission system for insertion into said current broadcast signal stream.

2. The system of claim 1, wherein said subscriber memory includes said demodulator and said data receiver.

3. The system of claim 1, wherein said first download path is a point-to-point data path and said second download path is a broadband broadcast data path.

4. The system of claim 3 where said broadband broadcast data path is a high definition television data path.

* * * * *